Aug. 4, 1931.    C. F. DOLL    1,816,929
CLUTCH
Filed April 23, 1928    2 Sheets-Sheet 1
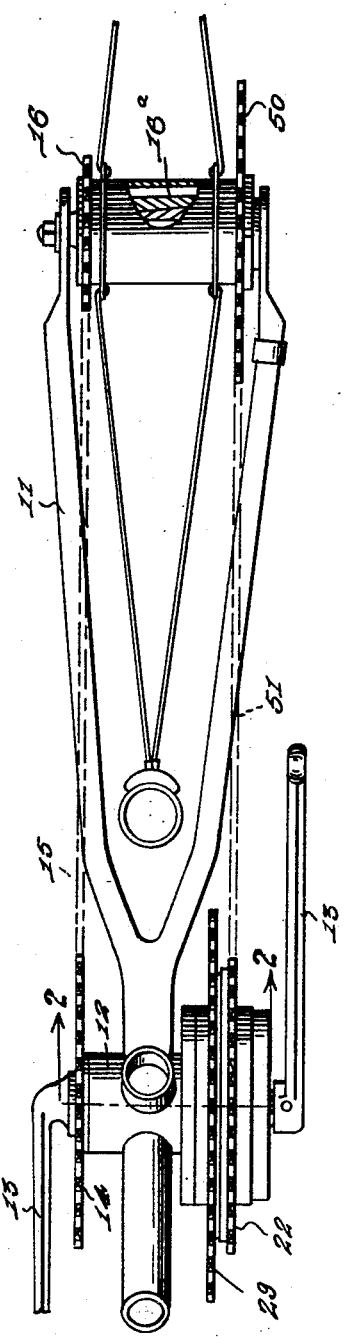

Aug. 4, 1931.  C. F. DOLL  1,816,929
CLUTCH
Filed April 23, 1928  2 Sheets-Sheet 2
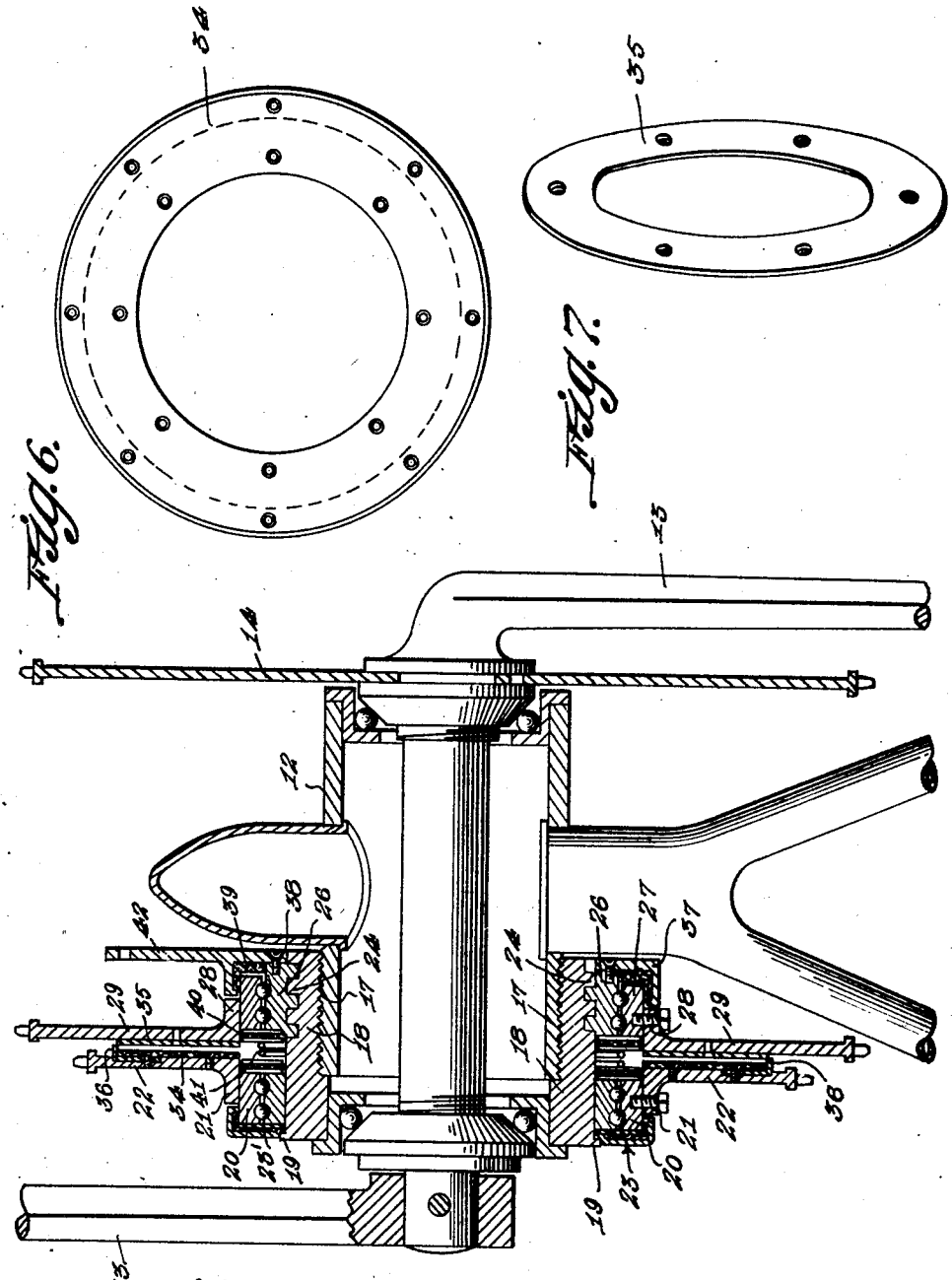
Charles F. Doll,
INVENTOR
BY Victor J. Evans
ATTORNEY Patented Aug. 4, 1931

1,816,929

UNITED STATES PATENT OFFICE

CHARLES F. DOLL, OF ABERDEEN, WASHINGTON

CLUTCH

Application filed April 23, 1928. Serial No. 272,171.

This invention relates to clutches of the dry plate or friction type wherein a threaded sleeve is employed for operating the clutch, an object being to provide simple, reliable and efficient means for connecting and disconnecting the driving and the driven member.

Another object of the invention is the provision of a clutch which is especially adapted for use in connection with rapidly travelling machines, wherein it is desirable to provide a smooth and positive application and release of power, the invention being especially adapted for use in connection with electric motors, gas and steam power in manufacturing industries, although being capable of many other uses.

With the above and other objects in view, the invention further includes the following novel features and details of construction, to be hereinafter more fully described, illustrated in the accompanying drawings and pointed out in the appended claims.

In the drawings:—

Figure 1 is a horizontal sectional view.

Figure 2 is an enlarged fragmentary section taken on the line 2—2 of Figure 1.

Figure 3 is a sectional view of the clutch sleeve.

Figure 4 is an elevation of the same.

Figure 5 is a sectional view of the laterally movable bearing of the clutch.

Figure 6 is an elevation of the friction lining.

Figure 7 is a detail perspective view of the friction ring.

Referring to the drawings in detail wherein like characters of reference denote corresponding parts, there is shown a portion of the frame of a bicycle, the rear forks of which are indicated at 11 while the crank hanger is indicated at 12 and the cranks at 13. The usual driving sprocket is indicated at 14 and this sprocket is connected by means of a chain 15 with the usual driven or coaster brake sprocket 16, which is connected to the coaster brake indicated at 16a, in the usual manner.

In making use of the present invention, a portion of the crank hanger 12 is exteriorly threaded as indicated at 17, the threads being left hand threads. Threaded upon this portion of the crank hanger is a sleeve 18 which is provided at its outer end with an annular flange 19. Mounted upon this sleeve is an anti-friction bearing 20 to one member of which is secured the hub 21 of what will be termed a traction sprocket 22. Interposed between the bearing 20 and the flange 19, and extending from the end of the bearing 20 is a dust plate 23. This dust plate is of annular formation and its inner edge is offset so as to engage between the flange 19 and the bearing 20 and yet provide space for the accommodation of a felt or like washer 23[1].

The sleeve 18 is provided exteriorly with relatively coarse square right hand threads 24 and these threads are engaged by threads 25 provided upon the inner periphery of the inner section 26 of an anti-friction bearing. The outer member 27 of this anti-friction bearing has secured thereto the hub 28 of a clutch sprocket 29 which is driven by means of a motor (not shown), suitably mounted within the frame of the bicycle.

The motor is preferably in the form of an internal combustion engine. The sprocket 22 has its inner face provided with a friction lining 34, while the opposed face of the clutch sprocket 29 carries a friction ring 35 which is preferably of bronze. An annular flanged ring 36 which is carried by the sprocket 22 extends over the edges of the lining 34 and the ring 35 to exclude dust and dirt.

A dust plate 37 is secured to the inner bearing member 26 by means of screws 38 and this plate houses a felt or other washer 39 while similar washers 40 are interposed between the anti-friction bearing members, and the spring 41 which is positioned between these members. The washers 40 also act to exclude dust, while the spring 41 yieldingly holds these washers in place. The plate 37 is provided with an arm 42 which is arranged to be manually operated.

The bicycle may be operated in the usual manner by the use of the pedals 13, the latter being operated in one direction to propel the bicycle forward, while a reverse movement of the pedals will apply the coaster brake where said brake is used. When it is desired to operate the bicycle from the power engine the arm 42 is moved so as to rotate the plate 37.

As this plate 37 is secured to the bearing member 26, the latter will be rotated upon the sleeve 18 in a direction to cause this bearing member to move spirally toward the outer end of the sleeve. This will cause engagement between the sprockets 22 and 29 (or the friction elements 34 and 35 carried by said sprockets) and as the sprocket 29 is driven from the motor, motion will be imparted to the sprocket 22 to drive a sprocket 50 which is rigid with the coaster brake hub or the driving hub of the bicycle. When the bicycle is put in motion through the operation of the pedals, the friction elements 34 and 35 can then be engaged so as to start the operation of the motor, very much after the manner of starting an automobile engine through the use of the starting motor. As a chain 51 connects the sprocket 50 with the sprocket 22, the bicycle will then be driven from the motor.

By means of the screws 38, the plate 37 may be adjusted circumferentially with respect to the inner member 26 of the bearing, so that the arm 42 may be properly positioned to provide for proper action of the clutch. This adjustment is effected by providing circumferentially spaced openings in the member 26 to receive the screws 38 so that the position of the plate 37 may be changed with respect to the member 26.

The invention is susceptible of various changes in its form, proportions and minor details of construction and the right is herein reserved to make such changes as properly fall within the scope of the appended claims.

Having described the invention what is claimed is:

1. In a motor driven bicycle, a frame supported crank hanger, a sleeve mounted upon the crank hanger, a sprocket freely rotatable upon the sleeve, a bearing threadedly engaging the sleeve, a driving sprocket freely rotatable upon the bearing, and means connected to the bearing to move the latter and engage the driving sprocket with the freely rotatable sprocket to rotate the latter.

2. In a motor driven bicycle, a frame supported crank hanger, a sleeve mounted upon the crank hanger, a sprocket freely rotatable upon the sleeve, a bearing threadedly engaging the sleeve, a driving sprocket freely rotatable upon the bearing, and a rotatable plate secured to the bearing and adapted to be operated to move the latter and engage the driving sprocket with the freely rotatable sprocket and means to operate the plate.

3. In a clutch, a sleeve, a bearing freely rotatable upon one end thereof, a sprocket rigid with said bearing, a second bearing threadedly engaging the sleeve, whereby rotation of said threadedly engaged bearing will move the latter with respect to the first mentioned bearing, a sprocket carried by the threadedly engaged bearing for movement into and out of engagement with the first mentioned sprocket to control the operation of the latter, and means to rotate the threadedly engaged bearing.

4. In a clutch, a sleeve, a bearing freely rotatable upon one end thereof, a sprocket rigid with said bearing, a second bearing threadedly engaging the sleeve whereby rotation of the threadedly engaged bearing will move the latter with respect to the first mentioned bearing, a sprocket carried by the threadedly engaged bearing for movement relative to the first mentioned sprocket to control the operation of the latter, friction elements carried upon the opposed faces of the sprockets, means carried by one of the sprockets and extending from the edges of the friction elements to protect the latter, and means to rotate the threadedly engaged bearing.

In testimony whereof I affix my signature.

CHARLES F. DOLL.